(12) United States Patent
Kuvaja et al.

(10) Patent No.: US 10,814,328 B2
(45) Date of Patent: Oct. 27, 2020

(54) DUST SEALING

(71) Applicant: Metso Minerals, Inc., Helsinki (FI)

(72) Inventors: Kari Kuvaja, Tampere (FI); Aki Lautala, Tampere (FI); Mika Peltonen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 435 days.

(21) Appl. No.: 15/535,158

(22) PCT Filed: Nov. 10, 2015

(86) PCT No.: PCT/FI2015/050778
§ 371 (c)(1),
(2) Date: Jun. 12, 2017

(87) PCT Pub. No.: WO2016/097465
PCT Pub. Date: Jun. 23, 2016

(65) Prior Publication Data
US 2017/0333909 A1  Nov. 23, 2017

(30) Foreign Application Priority Data
Dec. 18, 2014 (FI) ...................................... 20146114

(51) Int. Cl.
*B02C 2/04* (2006.01)
*B02C 21/02* (2006.01)
*F16J 15/3268* (2016.01)

(52) U.S. Cl.
CPC ............... *B02C 2/047* (2013.01); *B02C 2/04* (2013.01); *B02C 21/026* (2013.01); *F16J 15/3268* (2013.01)

(58) Field of Classification Search
CPC .. B02C 2/00; B02C 2/04; B02C 2/045; B02C 2/047
See application file for complete search history.

(56) References Cited

U.S. PATENT DOCUMENTS

| | | | |
|---|---|---|---|
| 2,134,885 A | 11/1938 | Newhouse et al. | |
| 4,084,756 A | 4/1978 | Coxhill | |
| 5,971,306 A | 10/1999 | Ganser, IV et al. | |
| 9,238,228 B2 * | 1/2016 | Anttila | B02C 21/026 |

(Continued)

FOREIGN PATENT DOCUMENTS

| CN | 103534031 A | 1/2014 |
|---|---|---|
| GB | 917118 A | 1/1963 |
| GB | 1570015 A | 6/1980 |

(Continued)

OTHER PUBLICATIONS

Office Action for Russian Patent Application No. 2017124147 dated May 27, 2019.

(Continued)

*Primary Examiner* — Matthew Katcoff
(74) *Attorney, Agent, or Firm* — Andrus Intellectual Property Law, LLP

(57) ABSTRACT

A cone or gyratory crusher, including a slip ring, a crusher head, and a first sealing member, arranged between the slip ring and the crusher head, defining a first space above the first sealing member. A first flexible member is connected to the first sealing member and defines a second space below the first sealing member.

14 Claims, 8 Drawing Sheets

(56) References Cited

U.S. PATENT DOCUMENTS

2005/0269436 A1* 12/2005 Sawant .................... B02C 2/04
                                                      241/215
2014/0021280 A1    1/2014 Anttila et al.

FOREIGN PATENT DOCUMENTS

| | | | |
|---|---|---|---|
| JP | 2001170508 A | 6/2001 |
| JP | 2004136252 A | 5/2004 |
| JP | 2011506090 A | 3/2011 |
| JP | 2014108390 A | 6/2014 |
| RU | 1790444 A3 | 1/1993 |
| RU | 2180268 C2 | 3/2002 |
| RU | 2012151490 A | 6/2014 |
| WO | 2011139210 A1 | 11/2011 |

OTHER PUBLICATIONS

Office Action for Japanese Patent Application No. 2017-531812 dated Jun. 20, 2019.
Office Action for Chinese Patent Application No. 201580069466X dated Jun. 11, 2019.
Office Action for Finnish Patent Application No. 20146114 dated Aug. 20, 2015.
International Search Report and Written Opinion for International Application No. PCT/FI2015/050778 dated Mar. 9, 2016.
International Preliminary Report on Patentability for International Application No. PCT/FI2015/050778 dated Mar. 14, 2017.

\* cited by examiner

DUST SEALING

CROSS-REFERENCE TO RELATED APPLICATIONS

This application is the U.S. national stage application of International Application PCT/FI2015/050778, filed Nov. 10, 2015, which international application was published on Jun. 23, 2016, as International Publication WO 2016/097465 in the English language. The International Application claims priority of FI Patent Application 20146114, filed Dec. 18, 2014.

FIELD OF INVENTION

The invention generally relates to a dust sealing of a crusher. In particular, but not exclusively, the invention relates to a dust sealing of a cone or gyratory crusher.

BACKGROUND OF THE INVENTION

Mineral material, such as stone, is retrieved to be processed from the ground either by exploding or by digging. The mineral material may also comprise natural stone, gravel and construction waste. Both mobile and fixed plants are used for processing. The material to be processed is fed with e.g. an excavator or a wheel loader into a feed hopper of the processing plant, from where the material is forwarded to be processed.

A mineral material processing plant comprises one or more crushers and/or screens and possibly further devices such as conveyors. The processing plant may be fixed or mobile. In particular mobile processing plants are used in urban surroundings in processing recyclable material such as construction waste.

Crushing of mineral material produces dust and accordingly measures need to be taken to protect the parts of the mineral material processing plant against harmful effects that can be caused by the produced dust.

A cone or a gyratory crusher comprises an outer crushing shell fixedly mounted to an upper frame and an inner crushing shell, a mantle, fixedly mounted on a crusher head. The head is eccentrically moved and mineral material, such as stones, entering between the inner and outer crushing shells is crushed to smaller particles and fine particles as dust.

In a cone or gyratory crusher, the eccentric movement of the crusher head and the small up and down movements, of the crusher head cause challenges for dust sealing thereof.

The setting of the crusher is done by adjusting the head with a hydraulic cylinder or other suitable means, and the sealing element slides on the outer surface of the slip ring to the desired position according to the chosen setting. During crushing, the crushing forces cause a a small rapid up and down movement of the sealing element on the surface of the slip ring.

In a so called load mode wherein the setting of a crusher is substantially continuously adjusted in order to maintain a desired pressure level and/or power consumption level, the sealing moves up and down on the surface of the slip ring. The same occurs in an over load or a tramp release situations.

The up and down movement of the sealing causes wear to the sealing elements and their counterpart surfaces and the clearance therebetween increases causing the dust to penetrate between the sealing arrangement and the slip ring or other counterpart of the sealing. The dust enters the inside of the crusher and mixes with lubricants resulting in increased wear of the sealing components and further parts of the crusher. Accordingly, a sealing arrangement capable of withstanding both the eccentric movement and the up and down movements is desired.

The objective of the invention is to provide a dust sealing mitigating the problems of existing sealing.

SUMMARY

According to a first aspect of the invention there is provided a cone or gyratory crusher, comprising:
  a slip ring;
  a vertically adjustable crusher head; and
  a first sealing member, arranged between the slip ring and the crusher head, defining a first space above the first sealing member; wherein the crusher further comprises
  a first flexible member connected to the first sealing member and defining a second space below the first sealing member.

The first flexible member may be attached to a second sealing member.

The first flexible member may be attached to a holding member.

The crusher may further comprise a second flexible member attached to the first sealing member and to a holding member and configured to prevent dust from entering into the gap between the first sealing member and the holding member.

The first flexible member may comprise canvas, rubber or plastic.

The first flexible member and/or the second sealing member may be configured to pull the first sealing member.

The first sealing member may extend below the holding member.

The first sealing member and/or the second sealing member may be configured not to rotate or slide with respect to the crusher head or the slip ring.

The first sealing member and the first flexible member may form a single-piece element.

According to a second aspect of the invention there is provided a mineral material processing plant comprising a cone or gyratory crusher according to the first aspect of the invention.

The mineral material processing plant may comprise a mobile plant.

According to a third aspect of the invention there is provided a sealing member configured to be arranged between a slip ring and a vertically adjustable crusher head of a cone or a gyratory crusher, comprising
  a first sealing member configured to define a first space above the first sealing member; and
  a first flexible member connected to the first sealing member and defining a second space below the first sealing member.

Different embodiments of the present invention will be illustrated or have been illustrated only in connection with some aspects of the invention. A skilled person appreciates that any embodiment of an aspect of the invention may apply to the same aspect of the invention and other aspects

BRIEF DESCRIPTION OF THE DRAWINGS

The invention will now be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
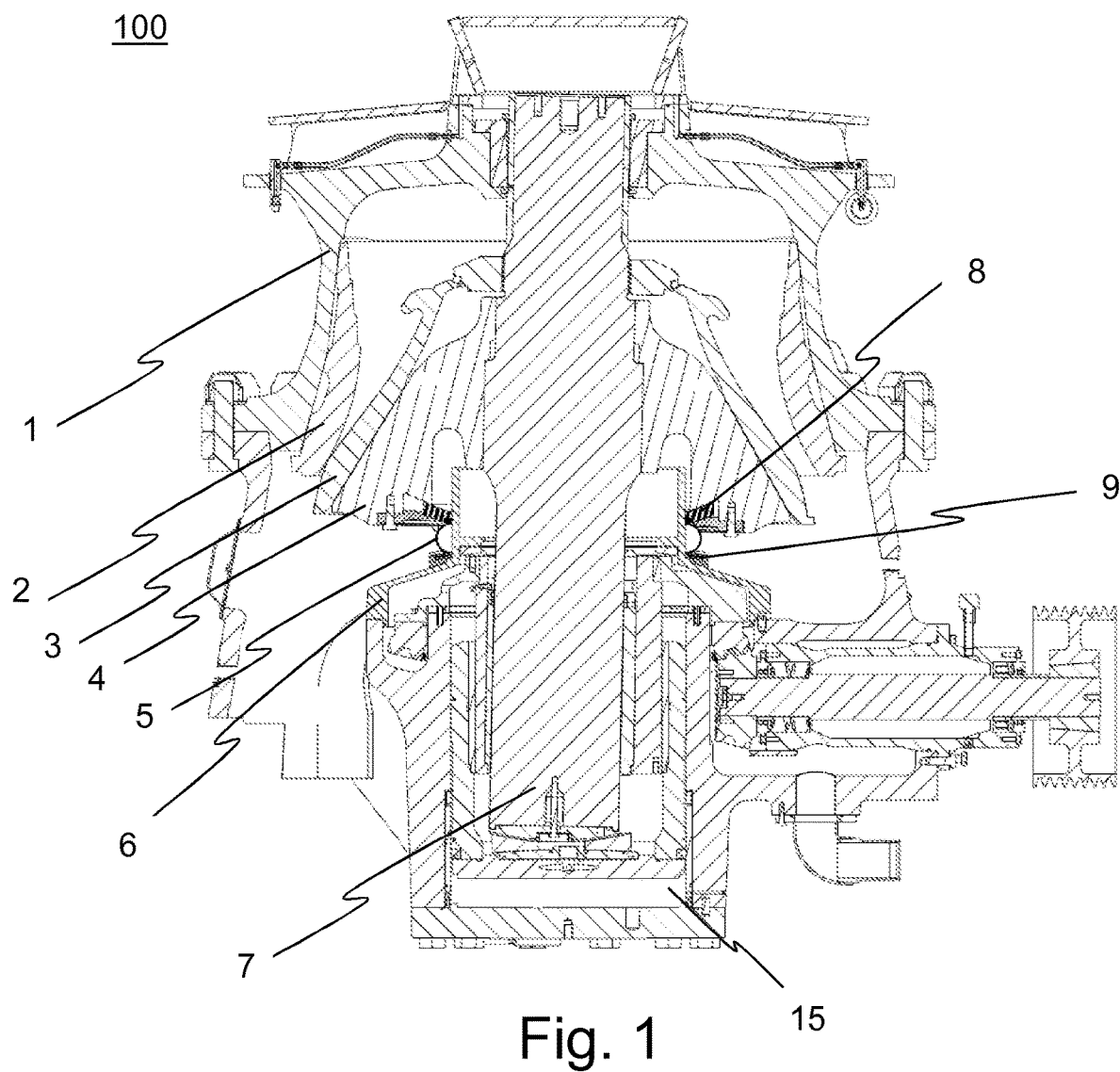
FIG. 1 shows a schematic cross-sectional view of a cone crusher comprising a dust sealing according to an example embodiment of the invention.

FIG. 1 shows a schematic cross-sectional view of a cone crusher (100) according to an example embodiment of the invention. Although FIG. 1 shows a cone crusher, the invention is not limited thereto, but is applicable in cone and gyratory crushers. FIG. 1 shows an upper crusher frame 1 whereto is attached an outer wear part 2. An inner wear part 3 is attached to a crusher head 4. The inner and the outer wear part define therebetween a crushing chamber in to which the mineral material to be crushed is fed. FIG. 1 further shows a slip ring 6 and a main shaft 7 configured for eccentric rotation. The main shaft 7 is attached to the crusher head 4 for providing the gyratory movement for crushing the mineral material between the inner 3 and outer 2 wear parts. The crusher further comprises hydraulic cylinder 15 for adjusting the setting of the crusher. A skilled person appreciates that FIG. 1 shows further previously known elements of the crusher 100 not explicitly mentioned herein, such as the drive arrangement of the main shaft, thrust bearings and eccentric sleeves.

The slip ring 6 is attached to the lower frame of the crusher and is configured to provide dust protection for the inner elements of the crusher, such as power transmission and eccentric bearings. The outer surface of the slip ring 6 has a cylindrical form and is configured to provide a sliding surface for a first sealing element 8.

A mineral material is being crushed in the crushing chamber, dust is produced. The dust is harmful to the functioning of the crusher. For example dust mixes with lubricants causing increased friction and wear to the parts. In order to prevent dust from entering between the crusher head 4 and the slip ring 6, the first sealing member 8 is provided. The first sealing member 8 is configured to prevent dust from entering he crusher and is held at place with a holding member 10 (see FIG. 2a).

Figure 3:
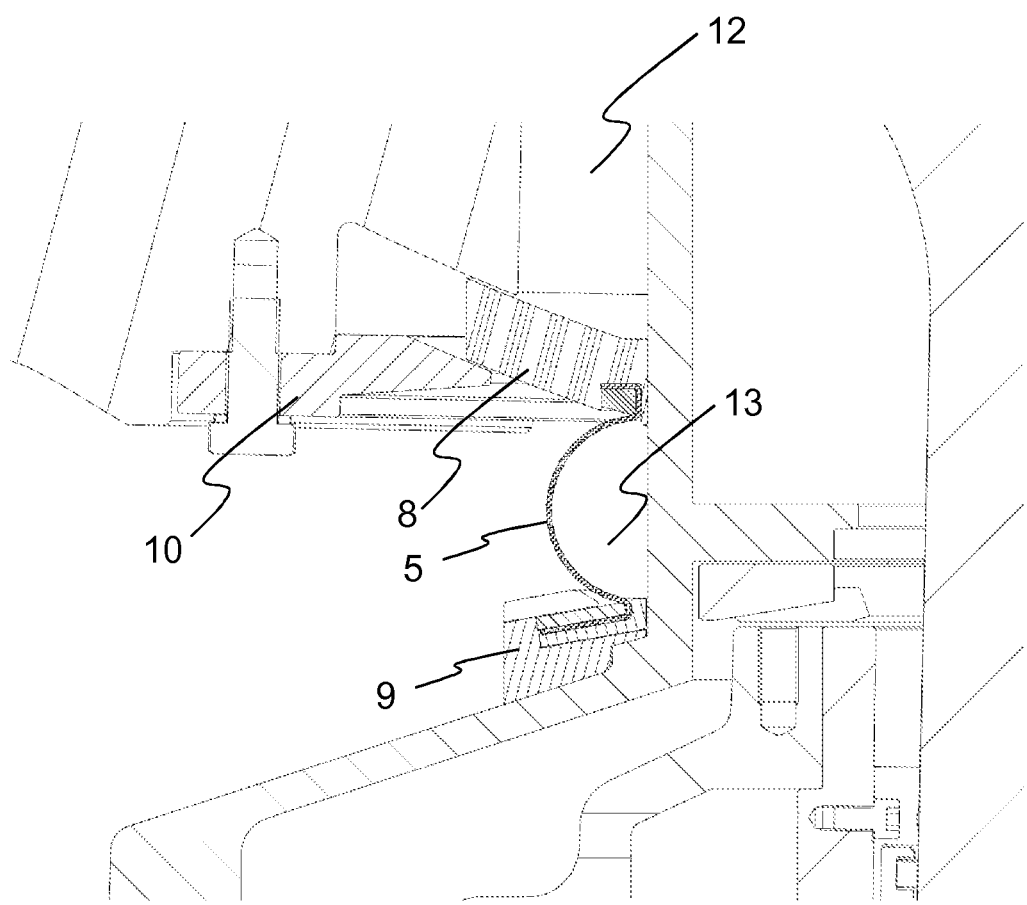
FIG. 3 shows a schematic cross-sectional view of the dust sealing according to an example embodiment of the invention.

The first sealing element 8 has a ring-like form and is formed in such a way as to allow the eccentric movement of the head. The first sealing element 8 has a first sliding surface on the inner perimeter against the slip ring 6 in order to prevent dust from entering between the first sealing element 8 and the slip ring 6, a second surface on the upper surface against the head 4 in order to prevent dust from entering between the head 4 and the first sealing element 8 and a third sliding surface on the lower surface against the holding member 10 again in order to prevent dust from entering therebetween. The first sealing member 8 defines, or delimits, a first space (12; FIG. 3) above the first sealing member comprising the space between the head 4 and the slip ring 6 and between the head 4 and the holding member 10.

However, the fast, for example 5 to 6 times per second occurring, up and down movement of the crusher head during crushing of mineral material causes dust to penetrate between the first sealing member 8 and the slip ring 6, the head 4 and the holding member 10 into the first space (12; FIG. 3). Accordingly, in an example embodiment of the invention, a flexible member 5 is connected to the lower surface of the first sealing member, thus forming a second space (13; FIG. 3) below the first sealing member, i.e. below the lower surface of the first sealing element, thus preventing or reducing the penetration of dust into the first space (12; FIG. 3). In an example embodiment, a second sealing member 9 is provided around the slip ring 6 and a first flexible member 5 is attached between the first 8 and second 9 sealing members. The first 8 and second 9 sealing member together with the first flexible member 5 prevent or reduce the penetration of dust between the crusher head 4 and the slip ring 6.

Figure 6:
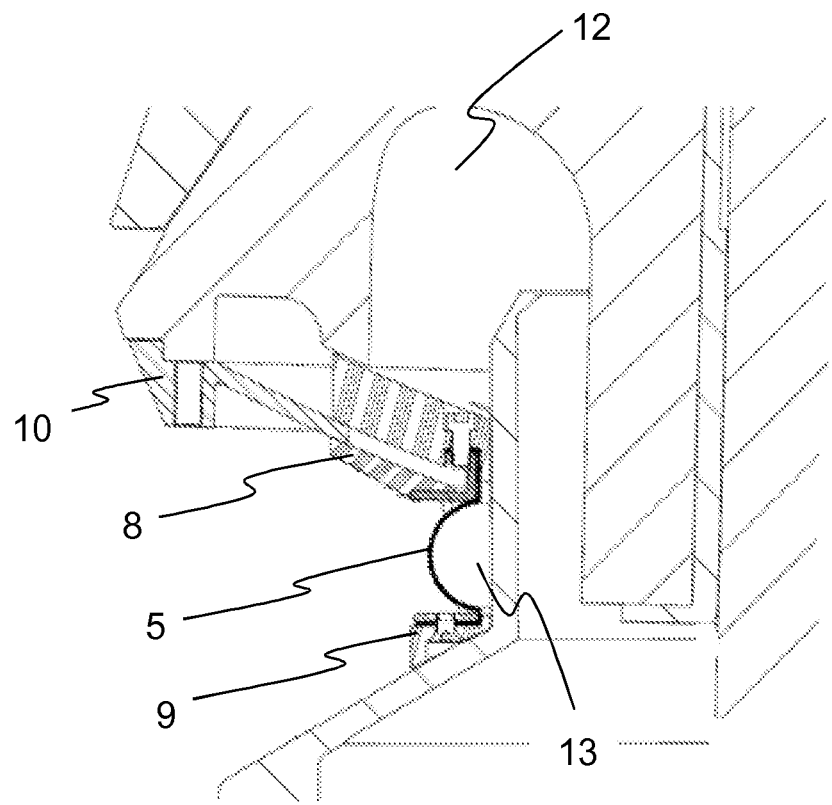
FIG. 6 shows a schematic cross-sectional view of the dust sealing according to a further example embodiment of the invention.

It should be noted that for reasons of clarity, the reference number for the first space 12 and the second space 13 is shown in FIGS. 3 and 6 only.

Figure 2A:
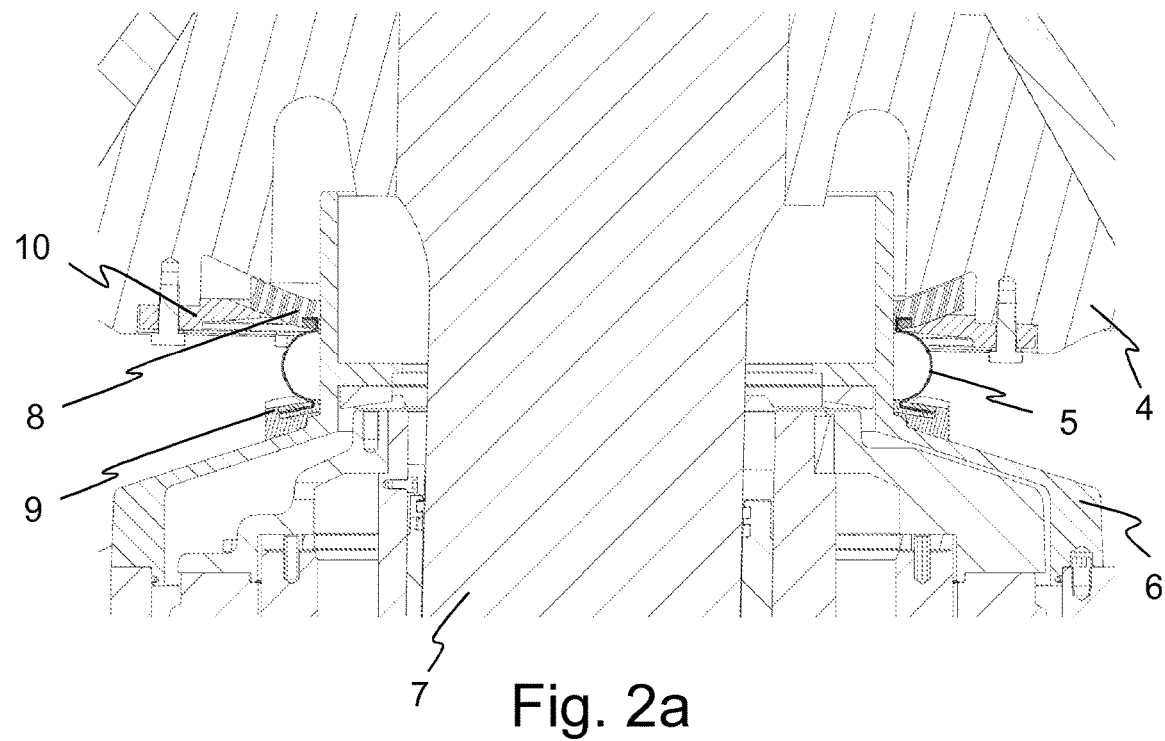
FIG. 2a shows an enlarged schematic cross-sectional view of the crusher of FIG. 1 according to an example embodiment of the invention.
Figure 4:
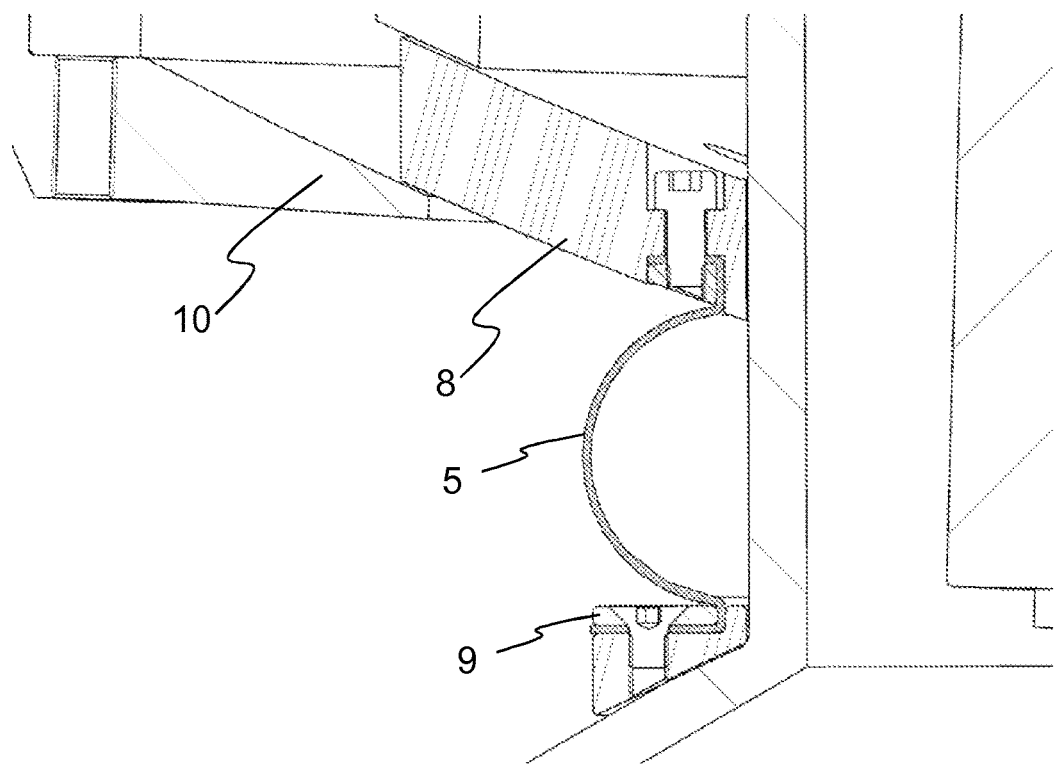
FIG. 4 shows a schematic cross-sectional view of the dust sealing according to a further example embodiment of the invention.

FIG. 2a shows an enlarged schematic cross-sectional view of the crusher of FIG. 1 according to an example embodiment of the invention. FIG. 2a shows the crusher head 4, the slip ring 6 and the main shaft 7. The first sealing member 8 is held at place with the holding member 10. First flexible member 5 is attached between the first 8 and second 9 sealing member, delimiting a second space (13; FIG. 3), and configured to prevent dust from entering into e.g. the gap between the first sealing member 8 and the slip ring 6, i.e. into the first space (12; FIG. 3). In an example embodiment, the first flexible member 5 is clamped to the first 8 and second 9 sealing member in a known manner as shown in FIG. 3 In further example embodiment, the first flexible member 5 is attached to the first 8 and second 9 sealing member in a known manner using e.g. bolts or further attachment elements as shown in FIG. 4. In a still further example embodiment, the first 8 and second 9 sealing members and the first flexible member 5 form a single piece element that can be easily installed and replaced or the first 8 and second 9 sealing members and the flexible member 5 are integrated together.

Figure 2B:
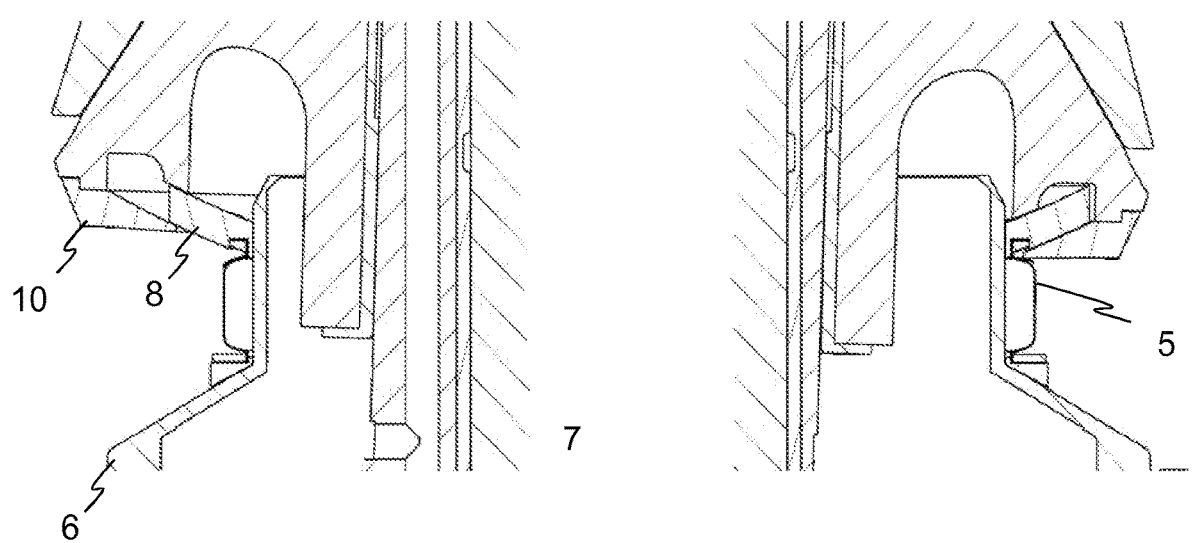
FIG. 2b shows an enlarged schematic cross-sectional view of a gyratory crusher with the dust sealing according to an example embodiment of the invention.

FIG. 2b shows an enlarged schematic cross-sectional view of a cone crusher with the dust sealing according to an example embodiment of the invention. FIG. 2b shows the main shaft 7 fixedly mounted to the frame of the crusher, the slip ring 6, the first sealing member 8 held at place with the holding member 10 and the first flexible member 5 attached between the first 8 and second 9 sealing member, delimiting a second space (13; FIG. 3), and configured to prevent dust from entering into e.g. the gap between the first sealing member 8 and the slip ring 6, i.e. into the first space (12; FIG. 3).

The first flexible member 5 comprises flexible material such as canvas, reinforced canvas, tarpaulin, rubber, reinforced rubber or plastic or any other suitable material. The first flexible member is configured to fold away from the main shaft 7 as the distance between the crusher head 4 and the slip ring 6 decreases so as not to disturb the operation of the crusher. In an example embodiment, the first 8 and second 9 sealing member are configured in such a way that they may rotate around the main shaft 7 and slip ring 6. In such a case the first flexible member 5 is subjected to forces due to unsynchronized rotation of the first 8 and second 9 sealing member. However, since the first flexible member 5 is attached to the first 8 and second 9 sealing member which are both allowed to rotate, the sealing member is not subjected to forces due to unsynchronized movement of the first sealing element 8 with respect to the slip ring 6 and accordingly the material need not be so strong. Furthermore, even if the first flexible member 5 should tear apart, the conventional sealing with the first sealing member 8 remains and no break in operation of the crusher is immediately necessary. In a further example embodiment, the second sealing element 9 is attached to, or locked with respect to, the slip ring 6 so that the flexible member 5 and the first sealing member 8 do not rotate around the slip ring 6. In a still further example embodiment, also the first sealing member 8 is attached to, or locked with respect to, the slip ring 6. In a still further example embodiment, the first sealing member is attached to, or locked with respect to, the head 4 so that the members 5, 8 and 9 are allowed to rotate around the slip ring 6.

In operation, the first sealing member 8 rotates with respect to the main shaft and/or the holding member 10 and the crusher head 4. Such rotation and up and down movement causes wear of the first sealing member 8 and in some cases a subsequent diminishing of the sealing effect. According to an embodiment of the invention, the first flexible member 5 and/or the second sealing member 9 is configured to pull the first sealing member 8 downwards on the sloping surface of the holding member 10 in order to maintain the sealing effect in case of wearing of the first sealing member 8. In an example embodiment, the weight of the second sealing 9 member and/or the weight of the first flexible member 5 is configured to cause the pulling down of the first sealing member 8. In a further example embodiment, the first flexible member 5 is structured in such a way, for example with tensioned reinforcement element, so as to pull down the first sealing member 8 in a manner alike that of a spring. In a further example embodiment, the second sealing member 9 is attached to the slip ring 6 in such a way that the rotation of the flexible member 5 and of the first sealing element 8 with respect to the slip ring 6 is allowed, but the vertical movement of the second sealing member is prevented. In such a case, the weight of the second sealing member has no effect.

Utilization of both first and second flexible members enables the first sealing member to be used as a support for the flexible members and provides more freedom of design for the sealing member 8.

Figure 5:
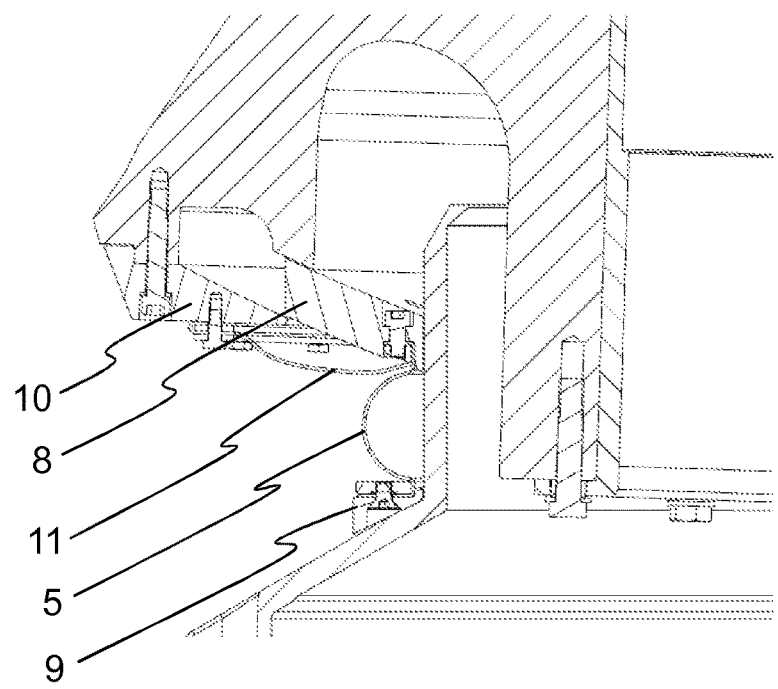
FIG. 5 shows a schematic cross-sectional view of the dust sealing according to a further example embodiment of the invention.

FIG. 5 shows a schematic cross-sectional view of the dust sealing according to a further example embodiment of the invention. FIG. 5 shows the first sealing member 8, the second sealing member 9, the holding member 10 and the first flexible member 5. Furthermore, FIG. 5 shows a second flexible member 11 attached between the holding member 10 and the first sealing member 8, thus increasing the second space (13; FIG. 3), and further configured to increase the sealing, i.e. to prevent dust from penetrating between the first sealing member 8 and the holding member 10. The second flexible member 11 comprises a member similar to the first flexible member 5. The cross-section of the flexible member 5 is a circular arch, preferably a semi circular arch, forming a toroid shape.

FIG. 6 shows a schematic cross-sectional view of the dust sealing according to a further example embodiment of the invention. FIG. 6 shows the first sealing member 8, the second sealing member 9, the holding member 10 and the first flexible member 5. The first sealing member 8 of the embodiment of FIG. 6 extends below the holding member 10 to provide further sealing. The first 12 and second 13 space are also shown.

Figure 7:
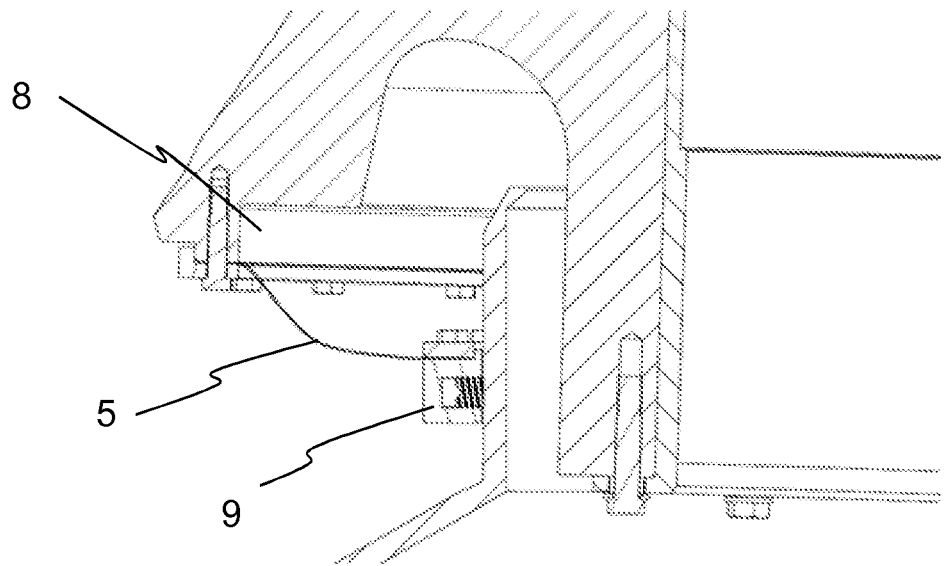
FIG. 7 shows a schematic cross-sectional view of the dust sealing according to a further example embodiment of the invention.

FIG. 7 shows a schematic cross-sectional view of the dust sealing according to a further example embodiment of the invention. FIG. 7 shows the first flexible member 5, the first sealing member 8 and the second sealing member 9. In the embodiment of FIG. 7, the first sealing member 8 is attached to the crusher head directly. In such an arrangement, the first sealing member 8 does not rotate or experience up and down movements with respect to the crusher head and accordingly wear is diminished. The second sealing element 9, in an embodiment comprises a wear compensated seal element.

Figure 8:
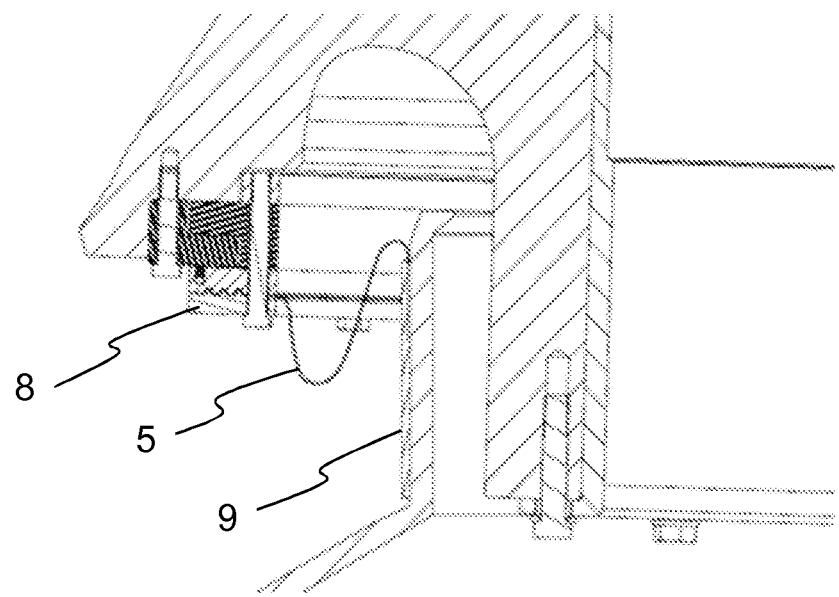
FIG. 8 shows a schematic cross-sectional view of the dust sealing according to a further example embodiment of the invention.

FIG. 8 shows a schematic cross-sectional view of the dust sealing according to a further example embodiment of the invention. FIG. 8 shows the first flexible member 5, the first sealing member 8 comprising a labyrinth seal attached to the crushed head and the second sealing member 9. In the embodiment of FIG. 8 the first sealing member does not rotate with respect to the crusher head and accordingly wear is diminished. No separate holding member is needed.

Figure 9:
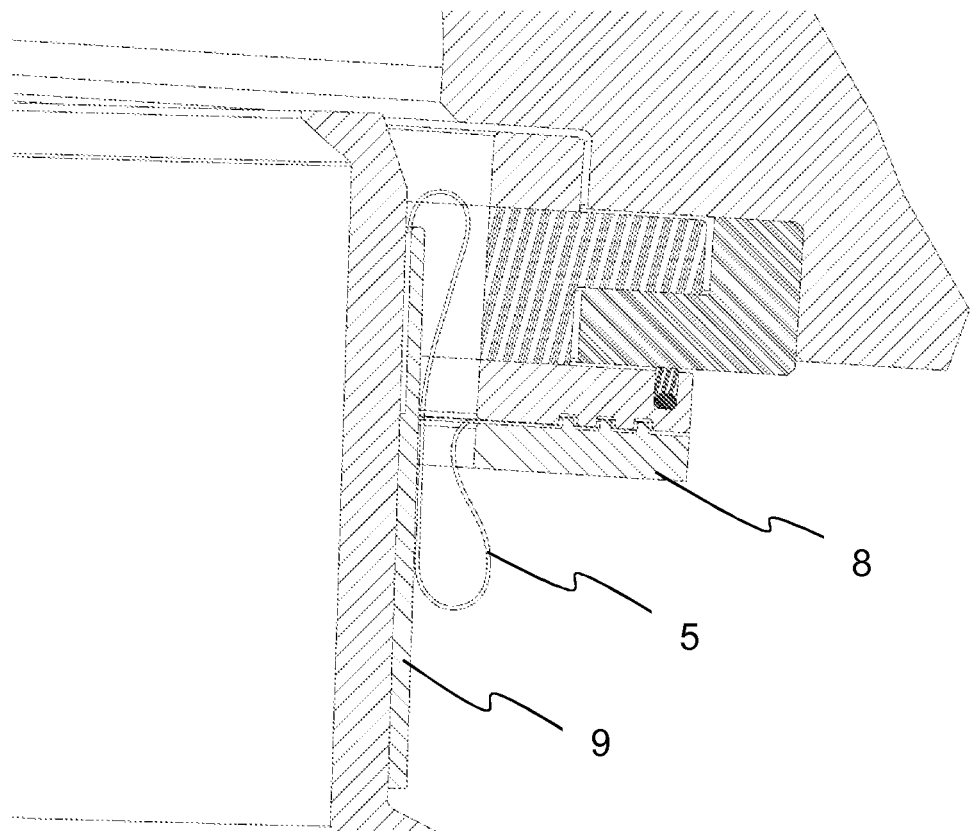
FIG. 9 shows a schematic cross-sectional view of the dust sealing according to a further example embodiment of the invention.

FIG. 9 shows a schematic cross-sectional view of the dust sealing according to a further example embodiment of the invention. FIG. 9 shows the first flexible member 5, the first sealing member 8 comprising a labyrinth seal and the second sealing member 9. No separate holding member is needed.

Figure 10:
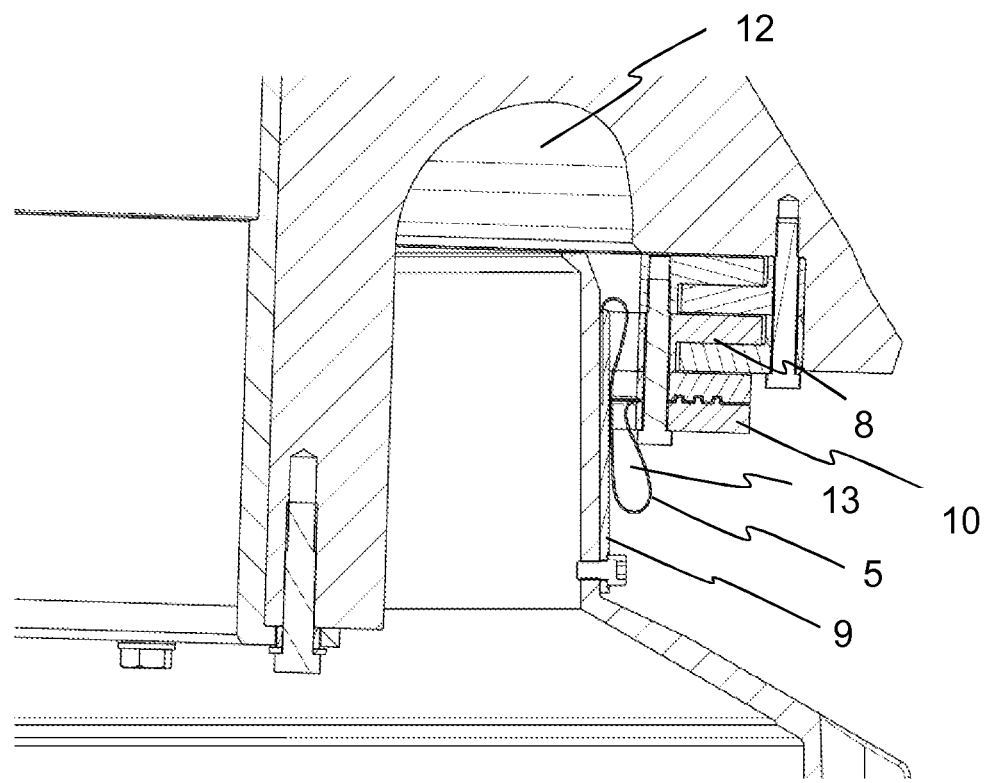
FIG. 10 shows a schematic cross-sectional view of the dust sealing according to a further example embodiment of the invention.

FIG. 10 shows a schematic cross-sectional view of the dust sealing according to a further example embodiment of the invention. FIG. 10 shows the first flexible member 5, the first sealing member 8, the second sealing member 9 attached to the slip ring, the holding member 10, the first space 12 and the second space 13. In the embodiment of FIG. 8 the first 8 and the second 9 sealing member do not rotate with respect to the crusher head and accordingly wear is diminished.

Figure 11:
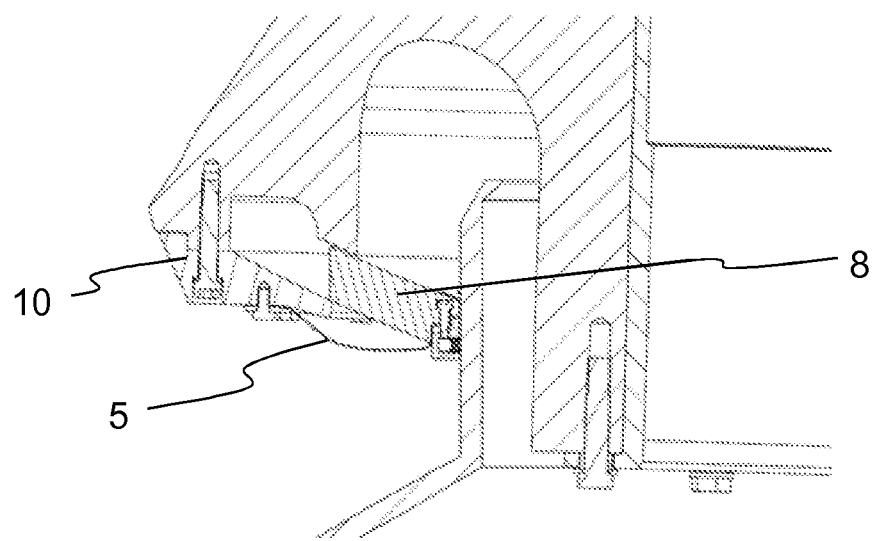
FIG. 11 shows a schematic cross-sectional view of the dust sealing according to a further example embodiment of the invention.

FIG. 11 shows a schematic cross-sectional view of the dust sealing according to a further example embodiment of the invention. FIG. 11 shows the first flexible member 5 and the first sealing member held at place with the holding member 10. In the embodiment of FIG. 1. The first flexible member 5 is attached between the first sealing member 8 and the holding member 10. Accordingly, the first flexible member prevents or reduces the penetration of dust between the holding member 10 and the first sealing member 8. The first sealing element 8, in an embodiment, comprises a wear compensated seal element.

Figure 12:
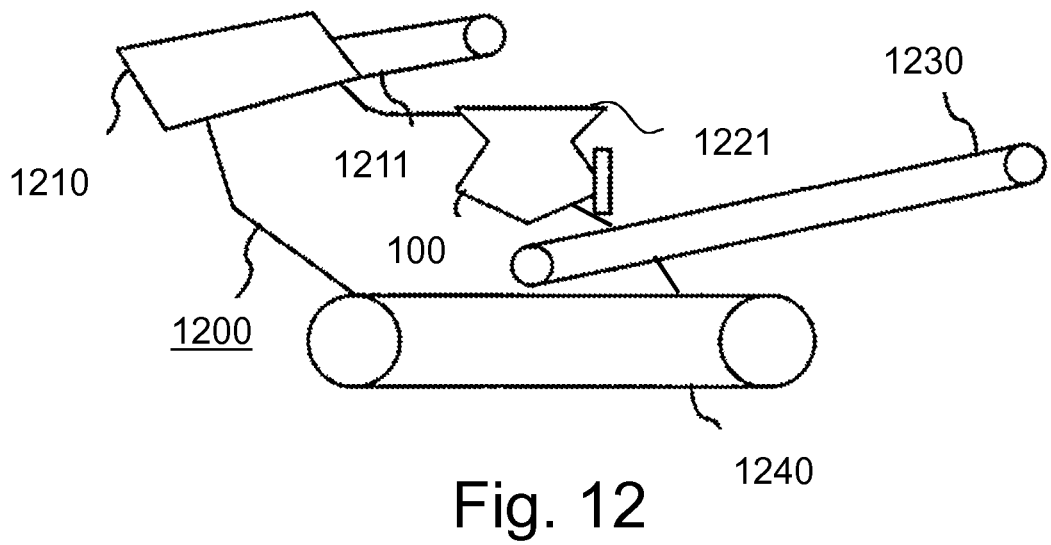
FIG. 12 shows a mineral material processing plant comprising a crusher comprising a dust sealing according to an example embodiment of the invention.

FIG. 12 shows a mineral material processing plant 1200 according to an example embodiment. The mineral material processing plant 1200 comprises a cone or a gyratory crusher 100 according to an example embodiment. The crusher can be used as a primary crusher, or for example as an intermediate or secondary crusher, furthermore the crusher can be used in fine crushing. In an example embodiment, the mineral material processing plant 1200 further comprises a feeder 1210 and conveyors 1211,1230. The mineral material processing plant according to an example embodiment is a mobile mineral material processing plant and comprises a track base 1240. Furthermore, a skilled person appreciates that the mineral material processing plant may comprise other parts and/or units not shown in FIG. 12, such as a motor and hydraulic circuits, and/or that some parts shown in FIG. 12 may not be present.

The material to be crushed is in an example embodiment fed to the feeder 1210 and therefrom by the conveyor 1211 to the crusher 100. The feeder 1210 may also be a so called scalper feeder. The material to be crushed coming from the conveyor is directed to the feed opening 1221. In a further example embodiment, the material to be crushed is fed to the feed opening directly, for example by a loader.

The skilled person appreciates that the mineral material processing plant 1200 can, in a further example embodiment, be a stationary mineral material processing plant comprising crushing, screening and conveying units. In a further example embodiment, the mobile processing plant may, instead of tracks depicted in FIG. 12, comprise wheels, legs, skids or other suitable support means.

Without in any way limiting the scope of protection, interpretation or possible applications of the invention, a technical advantage of different embodiments of the invention may be considered to be an improved dust sealing of the crusher.

Further, a technical advantage of different embodiments of the invention may be considered to be increased life time of crusher parts. Still further, a technical advantage of different embodiments of the invention may be considered to be an easier installation and replacement of the dust sealing. A further objective and advantage of the invention is to reduce or even eliminate the use of pressurized air directed inside the crusher for preventing dust to enter inside the crusher. Less pressurized air inside the crusher means reduced foaming of the hydraulic fluid that is used for lubrication.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A cone or gyratory crusher, comprising:
   a slip ring;
   a crusher head vertically adjustable for adjusting the setting of the crusher; and
   a first sealing member positioned between the slip ring and the crusher head such that a first sliding surface of the first sealing member contacts the slip ring, wherein the first sealing member creates a closed first space between the slip ring and the crusher head that is located above the first sealing member; and
   a first flexible member connected to the first sealing member and extending below the first sealing member, wherein the first flexible member creates a closed a second space between the first flexible member and the slip ring that is located below the first sealing member.

2. The crusher of claim 1, wherein the first flexible member is attached to a second sealing member.

3. The crusher of claim 1, wherein the first flexible member is attached to a holding member.

4. The crusher of claim 1, wherein the crusher further comprises a second flexible member attached to the first sealing member and to a holding member and configured to prevent dust from entering into the gap between the first sealing member and the holding member.

5. The crusher of claim 1, wherein the first flexible member comprises fibre glass, canvas, rubber or plastic or other dust tight material.

6. The crusher claim 2, wherein the first flexible member or the second sealing member is configured to pull or push the first sealing member.

7. The crusher of claim 1, wherein the first sealing member extends below a holding member.

8. The crusher of claim 2, wherein the first sealing member or the second sealing member is configured not to rotate or slide with respect to the crusher head or the slip ring.

9. The crusher of claim 1, wherein the first sealing member and the first flexible member form a single-piece element.

10. A mineral material processing plant comprising a cone or gyratory crusher according to claim 1.

11. A mineral material processing plant according to claim 10, wherein the mineral material processing plant comprises a mobile plant.

12. A sealing member configured to be arranged between a slip ring and a crusher head vertically adjustable for adjusting the setting of the crusher of a cone or a gyratory crusher, comprising:
    a first sealing member positioned between the slip ring and the crusher head such that a first sliding surface of the first sealing member contacts the slip ring, wherein the first sealing member creates a closed first space between the slip ring and the crusher head that is located above the first sealing member; and
    a first flexible member connected to the first sealing member and extending below the first sealing member, wherein the first flexible member creates a closed second space between the first flexible member and the slip ring that is located below the first sealing member.

13. A cone or gyratory crusher, comprising:
    a slip ring;
    a crusher head vertically adjustable relative to the slip ring; and
    a first sealing member extending between the crusher head and the slip ring and having a first sliding surface configured to contact the slip ring to prevent dust from moving between the slip ring and the crusher head, wherein the first sealing member is attached to the crusher head by a holding member such that the first sealing member creates a closed first space above the first sealing member and between the slip ring and the crusher head; and a first flexible member connected to the first sealing member and configured to prevent dust from moving between the first sliding surface of the slip ring and the crusher head, wherein the first flexible member creates a closed second space below the first sealing member and between the first flexible member and the slip ring.

14. The crusher of claim 2, wherein the first flexible member is configured to flex when the first sealing member and the second sealing members are moved together or are moved further apart.

* * * * *